(12) United States Patent
Khan (10) Patent No.: US 6,789,928 B2
(45) Date of Patent: Sep. 14, 2004

(54) AUTOMATIC MECHETRONIC WHEEL LIGHT DEVICE

(76) Inventor: Mohammed John Fitzgerald Khan, 14813 Mistletoe Ct., Silver Spring, MD (US) 20905

( * ) Notice: Subject to any disclaimer, the term of this patent is extended or adjusted under 35 U.S.C. 154(b) by 0 days.

(21) Appl. No.: 09/986,875

(22) Filed: Nov. 13, 2001

(65) Prior Publication Data

US 2003/0169594 A1 Sep. 11, 2003

(51) Int. Cl.$^7$ ............................. F21V 8/00; B60Q 1/26
(52) U.S. Cl. ..................... 362/500; 362/545; 362/464; 362/473; 340/441
(58) Field of Search ................................. 362/500, 464, 362/473, 802, 276, 800; 340/475, 479, 471, 472, 473, 441; 701/70; 40/547

(56) References Cited

U.S. PATENT DOCUMENTS

| | | | |
|---|---|---|---|
| 3,099,401 A | 7/1963 | Bell | |
| 3,767,909 A | 10/1973 | Bell | |
| 3,987,409 A | 10/1976 | Freeman | |
| 4,381,537 A | 4/1983 | Hinrichs | |
| 4,725,928 A | 2/1988 | Strepek | |
| 4,763,230 A | 8/1988 | Cummings | |
| 4,782,431 A | 11/1988 | Park | |
| 4,881,153 A | 11/1989 | Scott | |
| 5,016,144 A * | 5/1991 | DiMaggio | 362/35 |
| 5,121,305 A | 6/1992 | Reed | |
| 5,122,673 A | 6/1992 | Scott | |
| 5,392,200 A * | 2/1995 | Milde | 362/78 |
| 5,465,194 A * | 11/1995 | Currie | 340/479 |
| 5,497,302 A | 3/1996 | O'Donnell | |
| 5,548,274 A * | 8/1996 | Anderson et al. | 340/468 |
| 5,558,426 A | 9/1996 | Cabanatan | |
| 5,580,092 A | 12/1996 | Hsu | |
| 5,838,259 A * | 11/1998 | Tonkin | 340/903 |
| 5,876,108 A * | 3/1999 | Chien | 362/35 |
| 6,016,101 A * | 1/2000 | Brown | 340/432 |
| 6,045,244 A | 4/2000 | Dixon | |
| 6,116,762 A * | 9/2000 | Kutlucinar | 362/500 |
| 6,168,301 B1 * | 1/2001 | Martinez et al. | 362/500 |
| 6,175,196 B1 * | 1/2001 | Ragner et al. | 315/200 A |
| 6,176,603 B1 * | 1/2001 | Spicer | 362/500 |
| 6,220,733 B1 | 4/2001 | Gordon | |
| 6,485,169 B1 * | 11/2002 | Ragner | 362/500 |
| 6,601,979 B1 * | 8/2003 | Byrd et al. | 362/500 |
| 6,619,823 B2 * | 9/2003 | Dai | 362/500 |
| 2002/0133282 A1 * | 9/2002 | Ryan et al. | 340/441 |

* cited by examiner

Primary Examiner—Thomas M. Sember (57) ABSTRACT

A wheel lighting device for illuminating a wheel of a vehicle to increase safety and enhance aesthetics. The device produces the appearance of a "ring of light" on a vehicle's wheels as the vehicle moves. The "ring of light" can automatically change in color and/or brightness according to a vehicle's speed, acceleration, jerk, selection of transmission gears, and/or engine speed. The device provides auxiliary indicator lights by producing light in conjunction with a vehicle's turn signals, hazard lights, alarm systems, and etc. The device comprises a combination of mechanical and electronic components and can be placed on the outer or inner surface of a wheel or made integral to a wheel or wheel cover. The device can be configured for all vehicle types, and is electrically powered by a vehicle's electrical system and/or battery.

11 Claims, 7 Drawing Sheets

AUTOMATIC MECHETRONIC WHEEL LIGHT DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

This invention pertains to the area of illuminating safety devices, particularly to the area of illuminating safety devices for, but not limited to, bicycles, motorcycles, automobiles, trucks, and emergency response vehicles. This invention casts light from a wheel or wheel cover of a vehicle to make the vehicle more visible and, as an added benefit, provide aesthetic enhancement.

Manufacturers of domestically sold vehicles are required by the Federal government to equip their vehicles with illuminating side markers and/or light reflectors. This requirement is to help ensure the conspicuousness of the vehicle and reduce the risk for accidents. The aforementioned safety devices however, provide limited effectiveness. Illuminating side markers do not provide for a "bright" source of light and are thus commonly regarded as mere "accent lights". Additionally, illuminating side markers and light reflectors are "stationary" as they are invariably mounted in a fixed position on the fenders, quarter panels and bumpers of most vehicles. The present invention however, can greatly promote the conspicuousness of a vehicle for the following reasons: 1) The present invention generates a highly visible light of intense brightness and of varying colors; 2) The present invention rotates about the wheel's center and is thus "non-stationary"; and 3) The present invention is located on a vehicle where one would not normally expect light to emanate.

In recent years, explosive growth in the "aftermarket" automobile accessories industry has occurred. Studies show that domestic sales for automotive accessories that complement or create a unique look for vehicles have nearly doubled since 1985 and that automobile enthusiasts are likely to continue the escalating purchasing trend. Similar expansions in the aftermarket motorcycle accessories industry have also recently occurred. In addition to enhancing safety by making a vehicle more visible, the present invention enhances and personalizes the aesthetic appearance of vehicles. To date, such a wheel lighting system, particularly one that offers a plurality of lights, has not been commercially available. Because of the present invention's novelty in design and utility, the present invention could be a positive element in the aftermarket automobile and motorcycle accessories industry.

The wheel light systems of prior art, which are based on simple and obvious methods, present limitations in capability and applicability. The present invention however, overcomes the shortcomings of prior art, solves art-related problems, and offers uniqueness in technological design and functionality. Known and cited prior art include all listed herein:

| | | |
|---|---|---|
| 3,099,401 | Bell | July 1963 |
| 3,767,909 | Bell | October 1973 |
| 3,987,409 | Freeman | October 1976 |
| 4,381,537 | Hinrichs | April 1983 |
| 4,725,928 | Strepek | February 1988 |
| 4,763,230 | Cummings | August 1988 |
| 4,782,431 | Park | November 1988 |
| 4,881,153 | Scott | November 1989 |
| 5,121,305 | Reed | June 1992 |
| 5,122,673 | Scott | June 1992 |
| 5,497,302 | O'Donnell | March 1996 |
| 5,558,426 | Cabanatan | Sepember 1996 |
| 5,580,092 | Hsu | December 1996 |
| 6,045,244 | Dixon | April 2000 |
| 6,176,603 | Spicer | January 2001 |
| 6,220,733 | Gordon | April 2001 |

The proceeding discussions of select patents clearly illustrate how the present invention discloses new and preferred embodiments. A detailed comparison of all other cited prior art will yield the same conclusion.

U.S. Pat. No. 4,725,928, issued to Strepek, describes a "self-contained lighting assembly" device that includes a generator. Strepek's device is said to be suitable for "heavy trucks". Because of its girth and potential heaviness, Strepek's method is unsuitable for use with bicycles and especially unsuitable for motorcycles, wherein a low-mass, low-inertia system is crucial. Strepek's device also requires motion to generate electrical power to illuminate its lights. The present invention however, solves the problem of bulkiness and does not require motion to generate electrical power.

U.S. Pat. No. 4,782,431, issued to Park, teaches a complicated "magetogenerator" design, requiring many parts that are not likely to be inexpensively fabricated or easily installed. Like the aforementioned Strepek device, size, weight, and inertia potentially preclude Park's method from being suitable for use with bicycles and motorcycles. Park acknowledges the engineering burden of supplying a vehicle's electrical power to a light(s) on a rotating wheel. Park says, " . . . connecting the power source to the wheel lamps is . . . impossible . . . because of rotation of the wheels . . . " The current invention provides a solution for this problem while teaching simplicity and compactness and being suitable for bicycles and motorcycles.

U.S. Pat. No. 4,763,230, issued to Cummings, details a simple and obvious "light string" wheel light design. Cummings' device closely parallels, in appearance and functionality, ordinary string lights that have been commonly used for decorating Christmas trees for over 100 years. The Cummings' method is inherently unsuitable for many vehicle applications other than bicycles and does not change in color or brightness. The present invention however, applies to all vehicles that have wheels and offers vast improvements in capability.

U.S. Pat. No. 5,497,302, issued to O'Donnell, describes a "lighted hubcap" device for a wheel of an automobile. The activation of the lights of O'Donnell's device is limited to only when the automobile is moving O'Donnell's device therefore, can not function as auxiliary hazard lights or auxiliary turn signal lights when the automobile is not in motion. O'Donnell's device also fails to include the capability of activating a plurality of separate light circuits and the capability to achieve a change in color and/or brightness. Like the devices of Strepek and Park, O'Donnell's uses a generator. O'Donnell places the generator inside the hubcap cover and around the axle; this arrangement makes O'Donnell's approach unsuitable for bicycles and motorcycles since costly and impractical redesigns and retrofits for bicycle frames and motorcycle suspension components would likely be required.

U.S. Pat. No. 6,176,603, issued to Spicer, teaches a method for providing a light source behind the wheel of an automobile. Spicer's method employs "an annular light source" (such as a neon light tube formed in a circle) which, through the use of brackets, is mounted "behind" the wheel and affixed to the stationary "spindle" and "axle" of the automobile's front and rear wheel assemblies respectively. This method is clearly not suitable for bicycles or motorcycles. This technique also fails to be applicable for automobiles or other vehicles with non-stationary front spindles or non-stationary rear axles. This limitation of Spicer's method is significant since the majority of automobiles sold throughout the world today is front-wheel driven and have non-stationary front spindles. Furthermore, the majority of today's sports cars have non-stationary rear axles, not the "solid" axle designs as shown in FIG. 5 of Spicer's patent specification. The variations in automobile wheel and axle designs however, do not affect the utility of the present invention; the present invention can be crafted as a fitment for any vehicle regardless of the vehicle's wheel/axle assembly type. Additionally, since the Spicer method uses a stationary light source, it is not as effective in providing conspicuity as the present invention, which uses a rotating light source(s).

BRIEF SUMMARY OF THE INVENTION

The present invention is a means for automatic illumination of a wheel or wheel cover of an automobile, truck, motorcycle, bicycle, or any other vehicle that has wheels. The present invention creates the appearance of a continuous "ring of light" on a wheel when the wheel is rotating at a sufficient speed. The present invention, when in an automatic mode, also changes the color and/or brightness of the "ring of light" as a function of wheel speed. The invention includes the components that are necessary to generate light and is in the form of one or more light "emitter" assemblies that are either affixed to, or integral to a wheel or wheel cover, or flush mounted on a wheel's or wheel cover's surface. The emitter assembly can be of a geometric configuration that permits placement of the emitter assembly at some radius from the wheel's geometric center, or of such a geometry that allows the emitter assembly to be mounted concentrically to the wheel or wheel cover.

The present invention uses an electronic logic circuit (such as a multiple aperture window discriminator, comparator, or the like) that determines and discriminates a variable input voltage signal and provides an output voltage signal to trigger and control the activation of a light (such as a Light Emitting Diode (LED) or Organic LED (OLED)) or a plurality of lights. The present invention's power source can be either internal or external to the emitter assembly. The input voltage signal to the logic circuit is derived from the output of an accelerometer or other suitable transducer that responds to velocity, acceleration or force. Through the use of a transducer located at a point some distance from the center of the wheel, the present invention senses the centripetal acceleration of the wheel, which is produced when the wheel rotates, and generates a control signal that is proportional to the centripetal acceleration or corresponding wheel speed. When the transducer output signal reaches a predetermined value or range, conforming to an anticipated wheel speed, and is detected by the logic circuit, a specific light circuit and corresponding LED or plurality of LEDs is then energized. When the wheel speed increases sufficiently, the transducer output signal changes, exceeding the first predetermined range, resulting in the de-energizing of the first LED (or first plurality thereof) and simultaneous energizing of a second LED of a different color and/or brightness. This process can continue for as many light circuits as desired and reverses accordingly as the wheel speed decreases.

As a back-up automatic operational capability, the current invention includes a mechanical control means, a spring-mass system, for duplicate control of its light circuits. Centrifugal force is harnessed to activate the spring-mass control system. Internal to the emitter assembly are multiple spring/mass pairs that are aligned with respect to the wheel's centripetal acceleration vector so that, when the wheel rotates, each mass moves in response to the resultant centrifugal force and compresses its companion spring. The physical characteristics of each mass and spring are engineered so that a certain amount of spring deflection corresponds to a specific wheel speed and so that the spring/mass pairs have different deflection rates or "speed sensitivities". At a predetermined wheel speed, the first mass sufficiently compresses its companion spring and contacts and actuates an electrical circuit switch (such as a momentary microswitch) to energize an LED circuit. When the wheel speed sufficiently increases, the second mass compresses its companion spring enough to contact and actuate another electrical circuit switch and result in the de-energizing of the first LED(s) and simultaneous energizing of a second LED(s) of a different color and/or brightness. This process can continue for as many light circuits as desired and reverses accordingly as the wheel speed decreases.

The back-up operational capability as described above can be accomplished using a single spring/mass pair instead of multiple spring/mass pairs. The single spring/mass method also uses centrifugal force to cause the mass to move and compress a spring however; individual electrical switches may electively be used. The mass, fabricated out of an electrically conductive material can take the place of a switch. The electrically conductive mass moves amid electrical contacts and thus serves as a speed-sensitive "throw mechanism" of an electrical switch. At a predetermined centripetal acceleration or wheel speed, the mass sufficiently moves against the spring and is aligned with and bridges the first set of electrical contacts to close an electrical circuit to energize an LED(s). When the wheel speed increases, the mass moves against the spring sufficiently farther, breaking the connection between the first set of electrical contacts and bridging a second set of electrical contacts to close the circuit of a second LED(s) of a different color and/or brightness. This process can continue for as many light circuits as desired and reverses accordingly as the wheel speed decreases.

When electrical signals such as, but not limited to, variable input or output voltage signals from electronic components or transducers are used as control signals in the embodiments, the present invention also includes a remote control device that allows the vehicle operator to conveniently control/adjust the operation of the emitter assembly from the vehicle's driver seat. The remote control permits the operator at anytime to select which light circuits he/she wants to be "active." For example, if the operator wants the emitter assembly to produce only one particular color, regardless of wheel speed, the operator then correspondingly sets or programs the remote control. The remote control device also allows the vehicle operator to adjust the activation "timing" of the light circuits. For example, if it is assumed that the default activation sequence for a tri-color light emitter assembly is 20 miles per hour (mph)/40 mph/60 mph, the operator may program the remote control to change the activation sequence to 25 mph/55 mph/85 mph. This can be accomplished by the use of logic gates and/or other electronic switching techniques that are well known in the art.

The activation and control of the present invention's light circuits can also be accomplished by utilizing radio frequency (RF) transmission technology. Common among many of today's vehicles are electronic speedometers and tachometers. The outputs of the vehicle's electronic speedometer and tachometer can be used as input signals to an RF transmitter that sends a control signal to a receiver/controller, which can be integral to the emitter assembly's electronics. Other signal sources, which would be based on the vehicle's speed (or based on vehicle engine speed (typically expressed in revolutions per minute (RPM))) and could be derived from a mechanical means (i.e., a rotating cable of a mechanical speedometer or mechanical tachometer), could be used to trigger an output from an RF transmitter to control the activation of the present invention.

It is also within the scope of the present invention to couple the activation and control of the present invention's light circuits to a vehicle's automatic or manual transmission. This control methodology uses, but is not limited to, mechanical and/or electronic devices well known in the art that sense the shifting of gears within a vehicle's transmission. When the vehicle's automatic transmission shifts from one gear to another or, in the case with a manual transmission, when the vehicle operator manually shifts gears, the sensing device(s) determine which transmission gear is engaged and provides a corresponding control signal to energize a specific light circuit within the emitter assembly.

The preceding discussions disclose methods for automatic operation of the present invention. It is however, within the spirit of the present invention to manually control the activation of the lights without recognizing the speed, acceleration, or any other kinematic or dynamic attribute of either the vehicle or the vehicle's wheel(s), or, where applicable, the vehicle's engine or transmission. A simple remote control unit, which is accessible to the vehicle's operator from the vehicle's driver seat and does not depend on input signals such as those from accelerometers or other transducers, can be used to permit the operator to manually turn on, turn off, and adjust the brightness of the lights of the present invention.

It is also the object of the present invention to serve as auxiliary turn signals on vehicles that are so equipped. The present invention senses the activation of the vehicle's standard turn signals and simultaneously energizes a designated light circuit, which generates a "blinking" or "flashing" light(s) on the appropriate (left or right) side vehicle wheels. The light(s) blinks at the frequency and phase of the vehicle's standard turn signals and is the same color as the vehicle's standard turn signals ("Yellow" is typically the OEM color for new vehicles sold in the US.). (For motorcycles, the present invention generates "blinking" light(s) on the appropriate (left or right) side of each wheel and is not visible from the opposite side via a light separator or other means for blocking the transmission of light.) Concurrent to the activation of the auxiliary turn signals, all other light circuits within the emitter assembly are de-energized. When the vehicle's standard turn signals are canceled, the auxiliary turn signal circuit is de-energized and the electrical power is simultaneously restored to the emitter's other light circuits. Additionally, the auxiliary turn signal function of the present invention is independent of wheel motion.

In a manner similar to that described above, another object of the present invention is to serve as auxiliary brake lights. When the vehicle's brake lights are activated, the present invention simultaneously energizes a designated light circuit, which generates a light(s) that is the same color as the vehicle's standard brake lights ("Red" is the OEM color for new vehicles sold in the US.), for all wheels of the vehicle. (For motorcycles, the "Red" lights of the emitter assemblies simultaneously illuminate the left and right sides of each wheel.) Concurrent to the activation of the auxiliary brake lights, all other light circuits within the emitter assembly are de-energized. When the vehicle's standard brake lights are canceled, the auxiliary brake light circuit is de-energized and the electrical power is simultaneously restored to the emitter's other light circuits. The auxiliary brake light function of the present invention is also independent of wheel motion. The present invention offers its user the option to selectively assign precedence to the auxiliary brake light function over the auxiliary turn signal function or visa versa.

Yet another object of the present invention is to serve as auxiliary "hazard" signal lights on vehicles that are so equipped and operate in the manner similar to that disclosed above for the auxiliary turn signals and auxiliary brake lights. The auxiliary hazard light function of the present invention is also independent of wheel motion. The present invention offers its user the further option to selectively assign precedence to the auxiliary "hazard" light function.

Yet another object of the present invention is to provide additional warning lights that flash in conjunction with an alarm signal from an electronic anti-theft alarm device. Popular electronic alarms for vehicles activate the vehicle's horn, headlights, turn signal lights and brake lights. The present invention can be integrated to provide enhanced conspicuity and warning in alarm situations.

The current invention also provides a provision for manual cut off that can be used at anytime and an automatic means to conserve electrical power when the wheel is not rotating or when operated in daylight. These energy-economizing features are advantageous since they enable maximum practical use of the present invention's electrical power source.

BRIEF DESCRIPTION OF THE SEVERAL VIEWS OF THE DRAWING

FIG. 5 shows conductive wires rigidly attached to inner rotor surface providing transfer of electrical power from electrical "tracks" on outer rotor surface to emitter assembly.

DETAILED DESCRIPTION OF THE INVENTION

Figure 1:
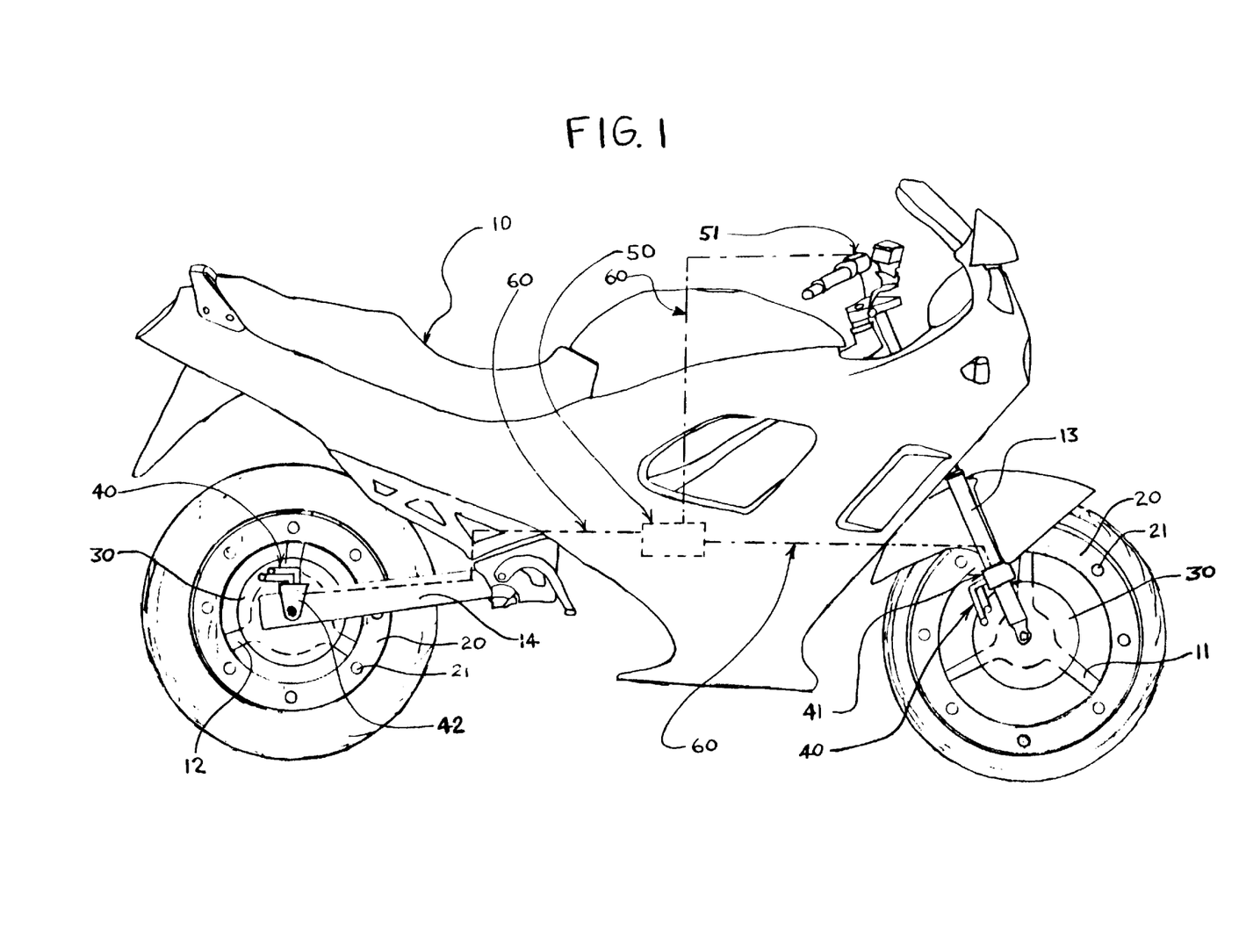
FIG. 1 is a side view of a modern sport-style motorcycle, showing the present invention configured for and installed on the motorcycle.

Referring to FIG. 1, which illustrates the present invention in a configuration suitable for functional installation on a modern motorcycle 10, the present invention comprises an emitter body 20 with lights 21 that is mounted on the front motorcycle wheel 11 and mounted on the rear motorcycle wheel 12, a rotor 30 mounted on the hub of the front motorcycle wheel and the hub of the rear motorcycle wheel, multiple carbon (or other suitable material) brushes 40 that are affixed to motorcycle front suspension fork 13 via brackets 41 and also affixed to motorcycle rear suspension swing arm 14 via brackets 42, an electronic control module 50, a remote control 51, and electrical wiring 60. Electrical power from the motorcycle 10 is delivered to emitter body 20 and lights 21 via passing through electrical wiring 60, through carbon brushes 40, and through rotor 30. When the operator of motorcycle 10 selects a desired wheel light function setting via the remote control unit 51, the electronic control module 50 regulates and directs electrical power to the appropriate circuits to achieve the desired wheel light function.

Figure 2:
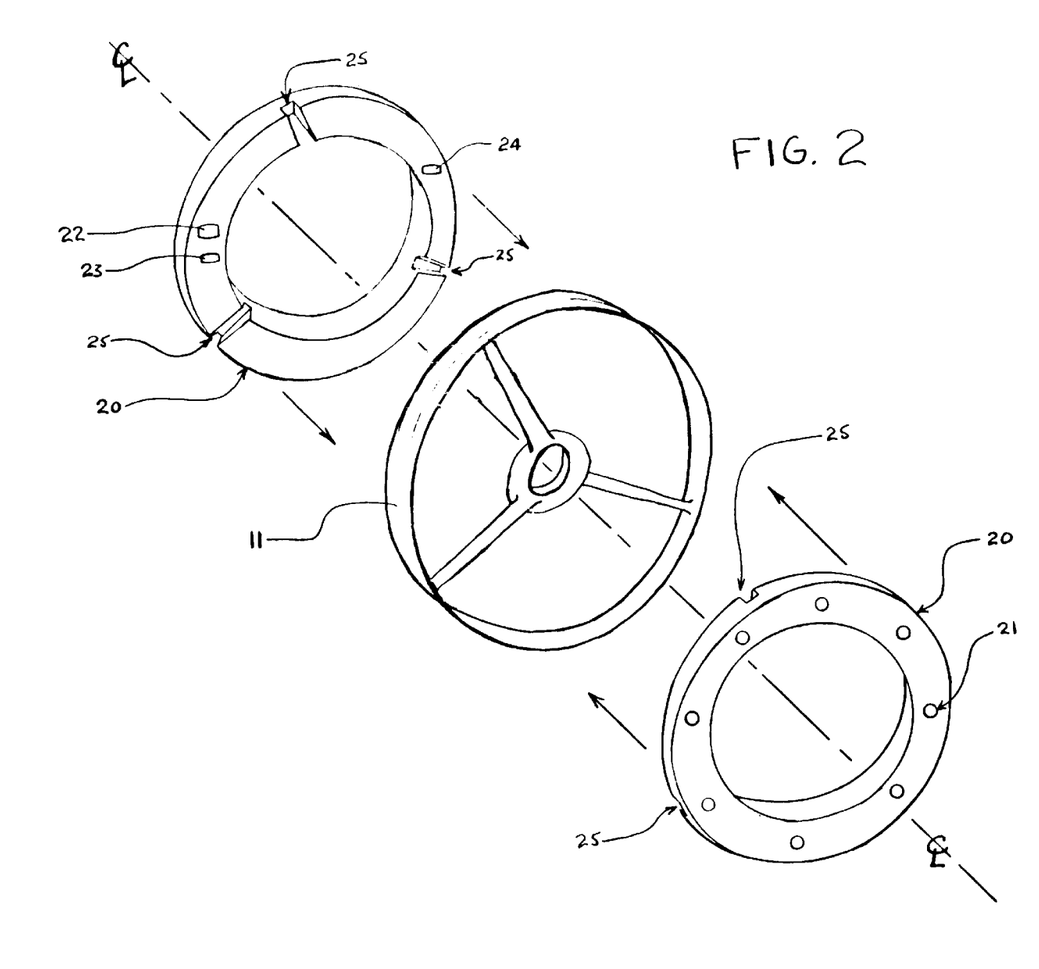
FIG. 2 is an "exploded" view of the present invention configured for a three-spoke wheel, showing "ring" or "donut" shaped emitter assembly halves and how the emitter assembly concentrically mounts on a three-spoke wheel.

As shown in FIG. 2, the emitter body 20 is a two-piece assembly that "sandwiches" the wheel 11 and features "locking voids" 25 to allow for a customized fit around the wheel's spokes or general shape or contour of wheel 11. The "locking voids" 25 for the spokes also serve to ensure the assembly's position on the wheel 11, precluding any potential for motion relative to the wheel 11. The emitter body 20 also features additional voids to accept integral internal components including lights 21, transducer/electronics assembly 22, spring/mass assembly 23 and a battery 24. The emitter body pieces are strongly secured together via suitable mechanical fasteners and/or built-in male-female "locking tabs". The emitter body is preferably fabricated from a lightweight and rigid material such as aluminum or plastic. Battery 24, which is used when electrical power from the vehicle is not available or as a back-up power source, energizes electrical circuits containing transducer/electronics assembly 22 and spring/mass assembly 23 to activate lights 21. Battery 24 is ideally easily replaceable or rechargeable through such conventional means including, but not limited to, solar recharging (photovoltaic) or electrical coupling e.g., a plug-in charger or from the vehicle's power source.

Figure 3:
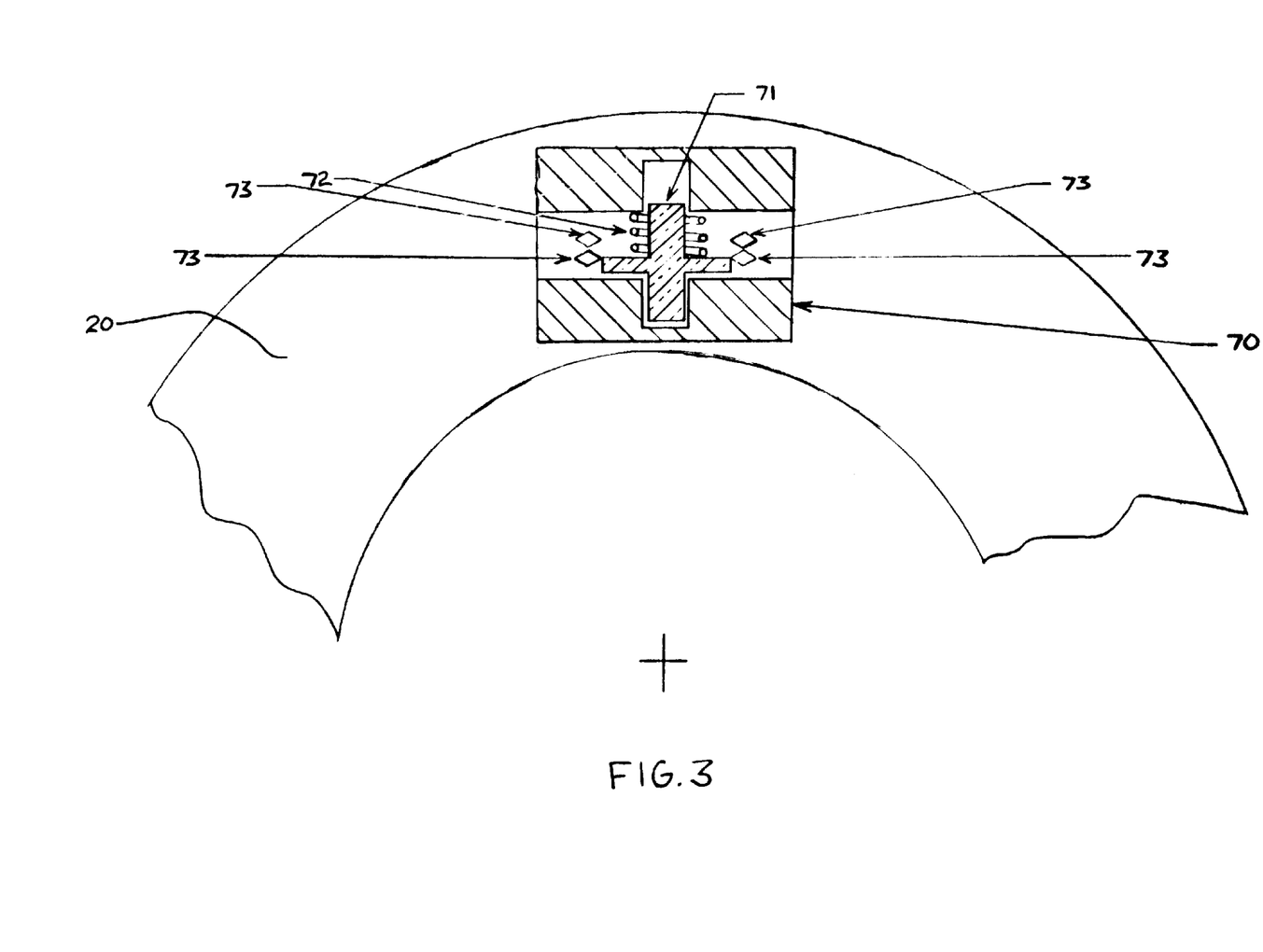
FIG. 3 is a cross-sectional view of spring/mass pair and electrical contact arrangement inside the "ring" type emitter assembly.

Referring to FIG. 3, the spring/mass assembly, emplaced within the emitter body 20, comprises an electrically nonconductive case 70, an electrically conductive mass 71, a spring 72, and electrical circuit contacts 73. In response to the centrifugal force of the electrically conductive mass 71 the spring 72 compresses as the emitter body 20 rotates with the wheel to which it is attached. The electrically conductive mass 71 moves linearly amid the electrical circuit contacts 73 that are fixed within the electrically nonconductive case 70. When the electrically conductive mass 71 has compressed the spring 72 sufficiently far, the electrically conductive mass 71 establishes an electrical connection between two electrical circuit contacts 73, closing a light circuit. When the electrically conductive mass 71 moves sufficiently farther in response to an increased wheel speed, the electrically conductive mass 71 establishes yet another electrical connection between other electrical circuit contacts 73 to close yet another light circuit. This process can continue for as many light circuits as desired and reverses accordingly as the wheel speed decreases. The electrically nonconductive case 70 is either pressed in or securely fastened inside the emitter body 20 but removable to allow for the installation of a different spring 72 and/or different electrically conductive mass 71 to achieve different light activation sensitivities. For example, if a heavier electrically conductive mass 71 is implemented, the closing of the light circuits and activation of the lights will occur more rapidly.

Figures 4, 5:
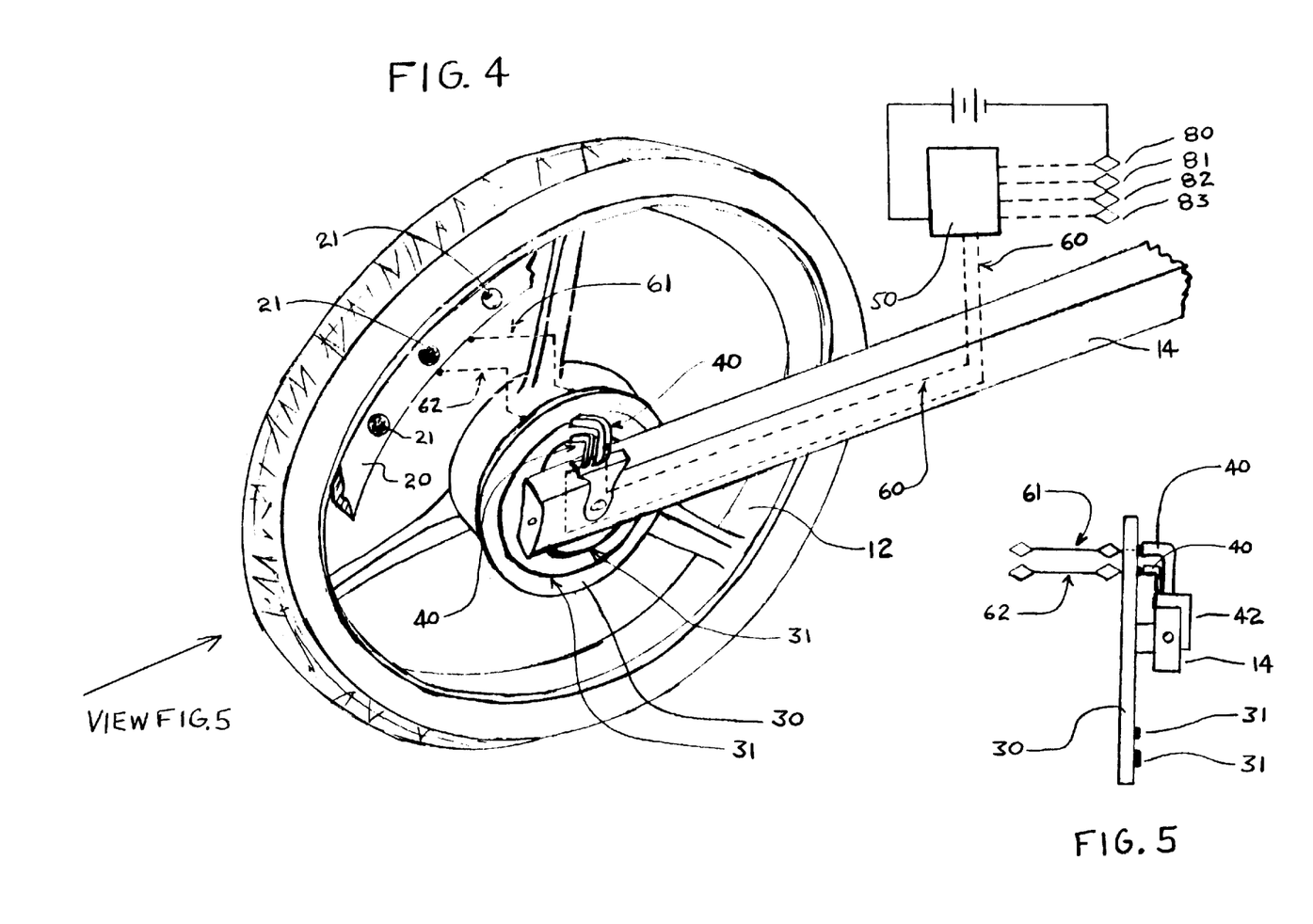
FIG. 4 is a perspective view of a motorcycle rear wheel and swing arm assembly, showing, a portion of a "ring" type emitter assembly mounted on the wheel, a rotor with conductive tracks mounted on the wheel, carbon brushes mounted on the swing arm, electrical wires connecting carbon brushes to the motorcycle's electrical system.
FIG. 5 is a detail end-view drawing of the rotor, carbon brushes, electrical "tracks" and wheel axle as viewed from the perspective indicated by the direction arrow in FIG. 4.

Referring to FIG. 4, the present invention further includes electrical tracks 31 on rotor 30 to provide a means for transferring the vehicle's electrical power to multiple electrical circuits within the emitter body 20. Through the use of electronic control module 50, the present invention switches the vehicle's electrical power between the various electrical tracks 31 based on the use of the vehicle's turn signals, brake lights, hazard lights, or theft alarm system to provide certain light functions. The electronic control module 50 receives signals from sensors 80, 81, 82, and 83, which detect the activation of the vehicle's turn signal lights, hazard lights, brake lights, and alarm system respectively. When the electronic control module 50 receives a signal indicating that the vehicle's left or right turn signal circuit is energized, the electronic control module 50 directs electrical power from any wheel light circuit within the emitter body 20 that may be energized and directs electrical power to the emitter's left or right "turn signal" circuit via the electrical wiring 60 and appropriate carbon brush 40 and electrical track 31. The emitter's turn signal circuit produces a flashing "yellow" light that is illuminated on the appropriate side of the wheel 12. In the same manner, the present invention provides light functions concurrent to the activation of the vehicle's hazard lights, brake lights, and theft alarm. The rotor 30 can be fabricated from an electrically nonconductive material and be separate from, or integrated in, or mounted on the existing brake rotor of the motorcycle or other vehicle. It should be obvious to persons skilled in the art that the lines drawn herein representing electrical wiring 60 for controlling the lights 21 on emitter body 20 could instead signify a wireless connection such as with RF transmission technology.

Referring to FIG. 4 and FIG. 5, lead wires 61 and 62 are each affixed at one end to inner side of rotor 30 and transfer electrical power from electrical tracks 31 to emitter body 20 at opposite ends. Lead wires 61 and 62 are stationary relative to rotor 30, wheel 12, and emitter body 20.

Figure 6:
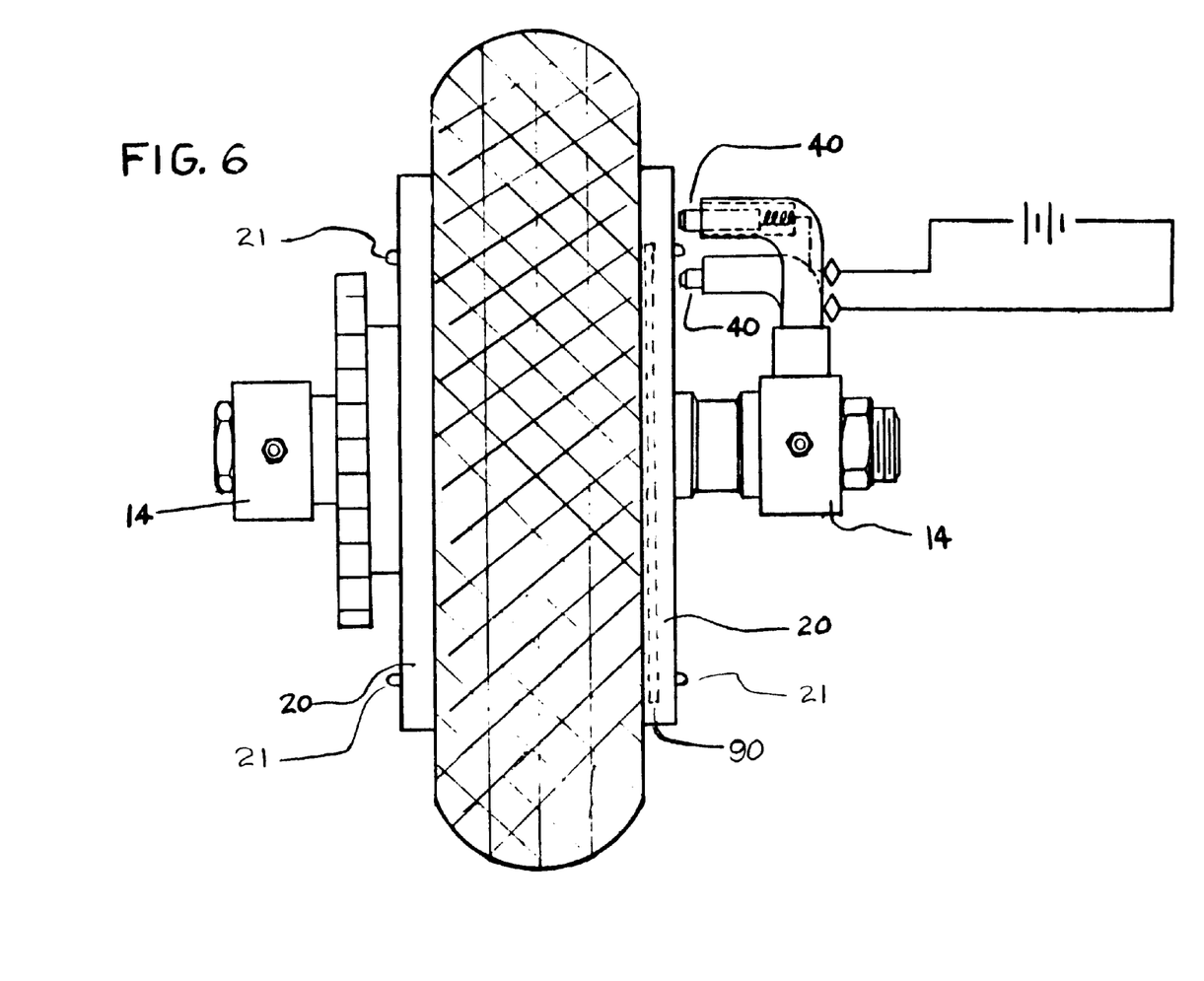
FIG. 6 is a rear-view drawing of a motorcycle's rear-wheel assembly and schematic of the motorcycle's electrical circuit, illustrating the placement of specialized fixtures that are rigidly mounted on the motorcycle's swing-arm and house common spring-loaded carbon brushes to transfer electrical power directly to the emitter assembly from the motorcycle's electrical system without a rotor.

Referring to FIG. 6, carbon brushes 40 contact electrical tracks that are emplaced directly on the emitter body 20. This configuration illustrates how the delivery of the vehicle's electrical power to the emitter body 20 is accomplished without the use of an "intermediate" rotor. While carbon brushes 40 indicate a physical connection, it is within the scope of the present invention to provide a non-physical connection/wireless transmission of electrical power as is known in the art of signal-powered receivers. (Wireless power transmission was taught as early as 1914 by Tesla; U.S. Pat. No. 1,119,732) In the case where emitter body 20 is fabricated of a transparent or translucent material, light barrier 90, which is shown internal to emitter body 20, precludes transmission of visible light from lights 21 to opposite side.

Figure 7:
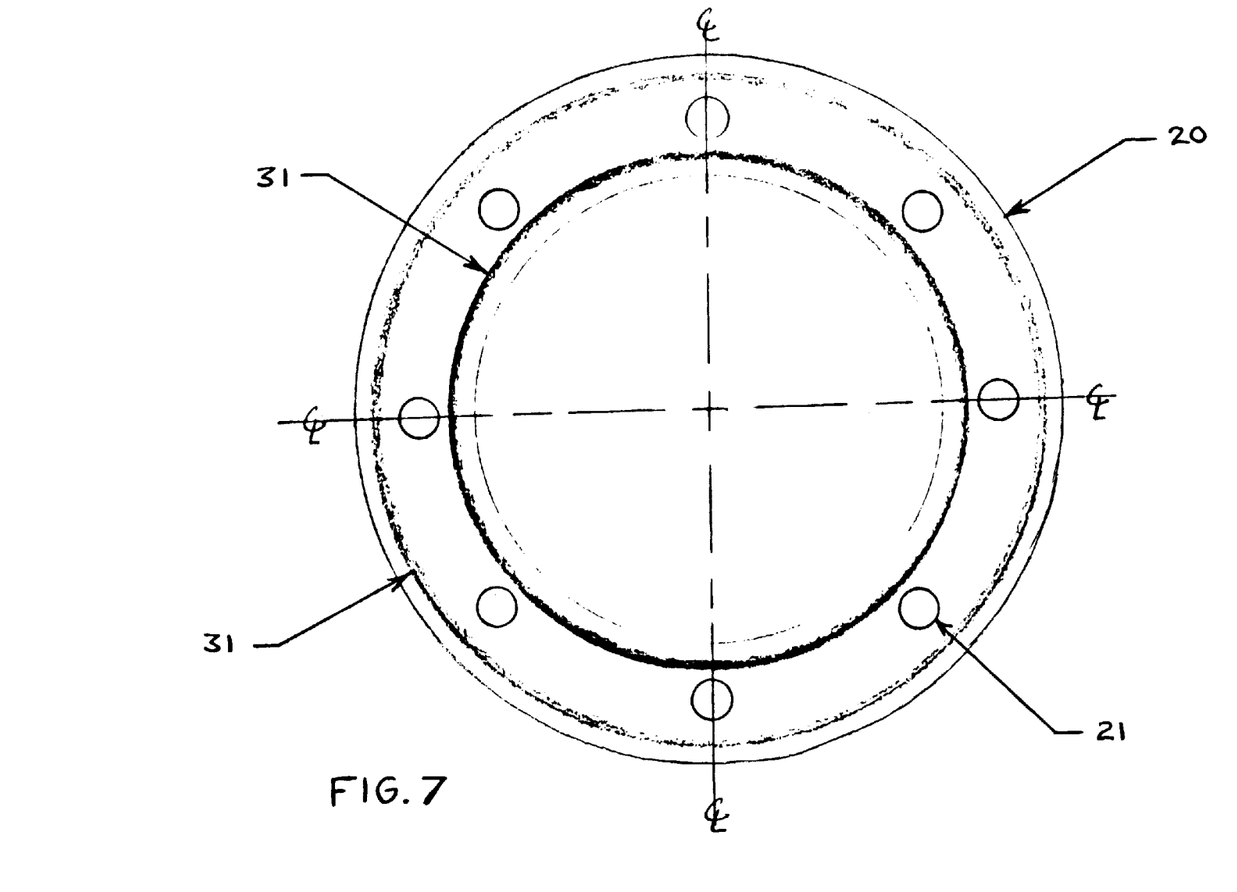
FIG. 7 is an enlarged side view of the "ring" style emitter assembly that illustrates two electrically conductive "tracks" that are each emplaced on the surface of the "ring" type emitter assembly at constant radii from the center of the emitter assembly. The tracks provide a direct electrical pathway to the components inside the emitter assembly.

Referring to FIG. 7, electrical tracks 31 emplaced on surface of emitter body 20 and spaced around lights 21, allow for the transfer of electrical power directly to the emitter body 20.

Figure 8:
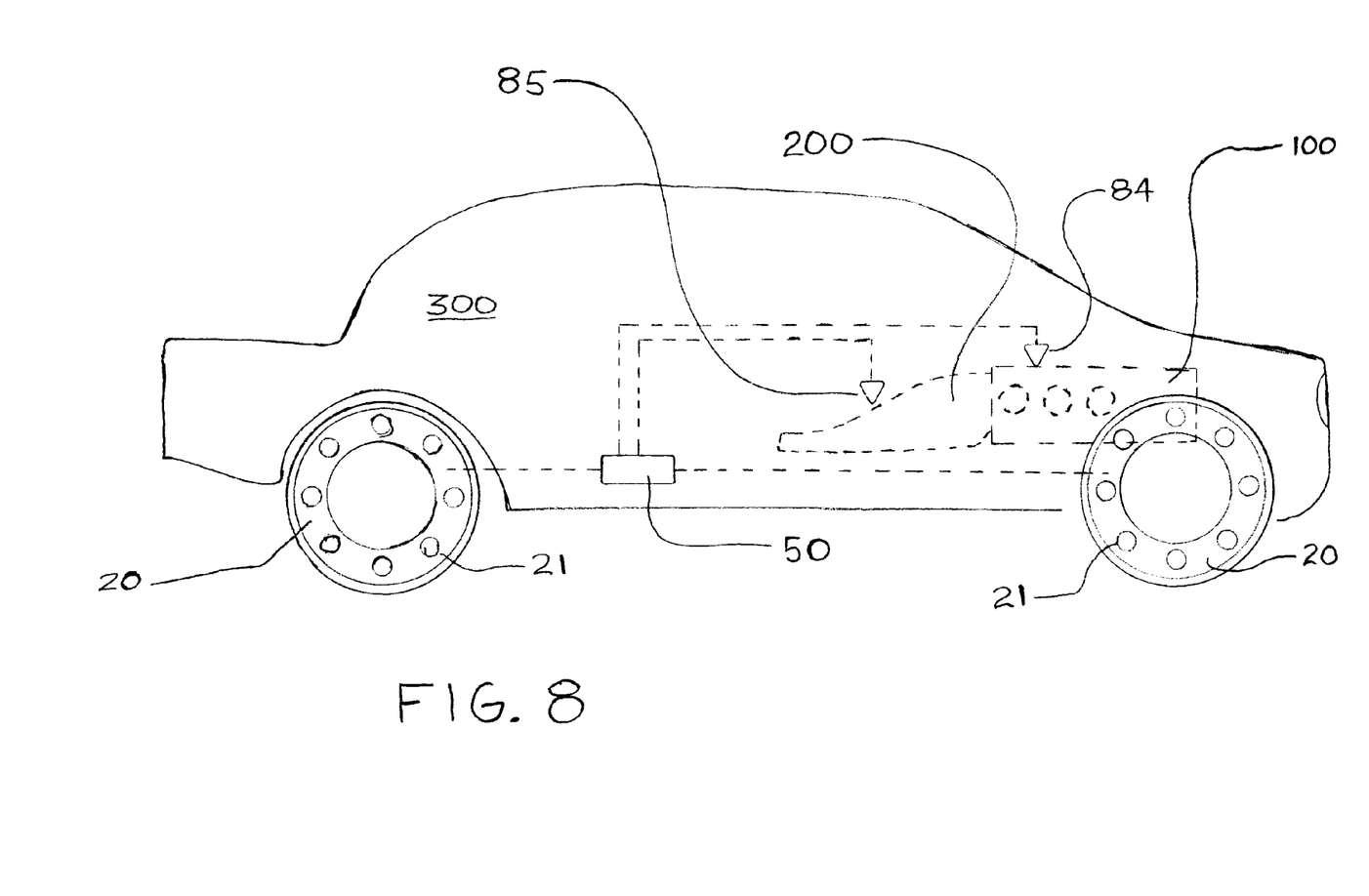
FIG. 8 is a drawing of an engine and transmission assembly inside an automobile and schematically depicts present invention embodiments including an engine speed sensor, a transmission gear position sensor, electronic control module, and emitter assemblies.

Referring to FIG. 8, automobile 300 is equipped with electronic control module 50 that directs electrical power to particular light circuits within emitter body 20 to energize lights 21 based on control signals received from either engine RPM sensor 84 or gear position sensor 85. When engine speed is used to activate and control circuits of lights 21, including the changing of the color and/or brightness of lights 21, engine RPM sensor 84 measures speed of automobile engine 100 and sends a control signal to electronic control module 50. The electronic control module 50 then directs electrical power to particular light circuits according to output of engine RPM sensor 84. If it is desired to change the color and/or brightness of lights 21 coincident with a gear shift, gear position sensor 85 is used to sense when a gear shift within the automobile transmission 200 occurs and determine which transmission gear is engaged. Gear position sensor 85 then sends a corresponding control signal to electronic control module 50 to activate a particular light circuit to achieve a certain light color and/or brightness.

It should be obvious to those with ordinary skill in the art that the use of transducers to measure wheel or vehicle speed and provide a control signal to activate the present invention's light circuits may be accomplished without involving a transducer placed directly on the wheel. For example, transducers that respond to airflow can be mounted on the vehicle's body or frame elements and electrically connected to the emitter assembly. Measuring and correlating the vehicle's engine speed to the vehicle's transmission gear ratios and final drive ratio is yet another way to determine the wheel speed and vehicle speed. It should also be obvious to those with ordinary skill in the art that the wheel jerk, vehicle acceleration, and vehicle jerk, which are the time derivatives of wheel speed and vehicle speed, can be measured and provide the basis of control for the present invention's light circuits.

It should also be obvious to those with ordinary skill in the art and especially obvious to those skilled in the art with a familiarity in the makeup of motorcycle chassis, that the drawings of the components of the present invention serve to illustrate only and that tangible components can take on variations and remain within the extent of the claims hereunder. Persons skilled in the art should also readily perceive how the present invention could be suitably configured (including changes in: geometry; means for electrical power transmission; mounting and fastening) for other vehicles (cars, buses, trucks, emergency response vehicles, etc.) of varying wheel and axle configurations, or made as an integrated "built-in" feature of a wheel or wheel cover without, in any manner, departing from the spirit of the present invention.

I claim:

1. A display device for a wheel in combination with a motorcycle, said motorcycle capable of having motion, including:

at least one means for producing light, said means for producing light includes at least one light source located on each side of said wheel, means for transferring electrical power from a power source not located on said wheel to said means for producing light, means for measuring at least one of the group consisting of: angular velocity of said wheel, angular or centripetal acceleration of said wheel, angular or centripetal jerk of said wheel, velocity of said motorcycle, acceleration of said motorcycle, jerk of said motorcycle, speed (RPM) of engine of said motorcycle, shifting of gears of transmission of said motorcycle, means for changing the electrical power applied to said means for producing light, said means for changing responsive to said means for measuring, said electrical power being applied to said means for producing light, means of transferring an electrical control signal to said wheel, said control signal being independent of said means for changing, wherein said electrical control signal is generated in response to the activation of a turn signal of said motorcycle, said electrical control signal selectively overrides said means for changing whereby when operator activates said turn signal, said means for producing light functions as an auxiliary turn signal indicator, means for blocking light separating the light sources whereby when an operator activates a turn signal of said motorcycle, said auxiliary turn signal indicator is apparently displayed only on one side of said wheel.

2. A display device for a wheel in combination with a motorcycle, said motorcycle capable of having motion, including:

at least one means for producing light, said means for producing light includes at least one light source that is visible only from one side of said wheel, means for transfering electrical power from a power source not located on said wheel to said means for producing light, means for measuring at least one of the group consisting of: angular velocity of said wheel, angular or centripetal acceleration of said wheel, angular or centripetal jerk of said wheel, velocity of said motorcycle, acceleration of said motorcycle, jerk of said motorcycle, speed (RPM) of engine of said motorcycle, shifting of gears of transmission of said motorcycle and, means for changing the electrical power applied to said means for producing light, said means for changing responsive to said means for measuring, said electrical power being applied to said means for producing light, means of transferring an electrical control signal to said wheel, said control signal being independent of said means for changing, wherein said electrical control signal is generated in response to the activation of a turn signal of said motorcycle, said electrical control signal selectively overrides said means for changing whereby when operator activates said turn signal, said means for producing light functions as an auxiliary turn signal indicator, means for blocking light separating the light sources whereby when an operator activates a turn signal of said motorcycle, said auxiliary turn signal indicator is apparently displayed only on one side of said wheel.

3. A display device for a wheel in combination with a motorcycle, said motorcycle capable of having motion, including:
  wherein said electrical control signal is generated in response to the activation of a turn signal of said motorcycle, said electrical control signal selectively overrides said means for changing whereby when operator activates said turn signal, said means for producing light functions as an auxiliary turn signal indicator,
  means for blocking light separating the light sources whereby when an operator activates a turn signal of said motorcycle, said auxiliary turn signal indicator is apparently displayed only on one side of said wheel.

4. A display device for a wheel in combination with a motorcycle, said motorcycle capable of having motion, including:
  at least one means for producing light, said means for producing light includes at least one light source that is visible only from one side of said wheel,
  means for transferring electrical power from a power source not located on said wheel to said means for producing light,
  means for measuring at least one of the group consisting of: angular velocity of said wheel, angular or centripetal acceleration of said wheel, angular or centripetal jerk of said wheel, velocity of said motorcycle, acceleration of said motorcycle, jerk of said motorcycle, speed (RPM) of engine of said motorcycle, shifting of gears of transmission of said motorcycle,
  means for changing the electrical power applied to said means for producing light, said means for changing responsive to said means for measuring, said electrical power being applied to said means for producing light,
  means for selectively activating said means for producing light such that at any moment in time, a light display unique to one side of said wheel relative to a coincident light display on the opposite side of said wheel can be produced whereby at least one of the group consisting of: color, brightness, on-off cycling (including the blinking action of a turn signal) of said means of producing light is visibly different when viewed from opposite sides of said wheel.

5. A display device for a wheel in combination with a motorcycle, said motorcycle capable of having motion, including:
  at least one means for producing light, said means for producing light includes at least one light source located on each side of said wheel,
  means for transferring electrical power from a power source not located on said wheel to said means for producing light,
  means for measuring at least one of the group consisting of: angular velocity of said wheel, angular or centripetal acceleration of said wheel, angular or centripetal jerk of said wheel, velocity of said motorcycle, acceleration of said motorcycle, jerk of said motorcycle, speed (RPM) of engine of said motorcycle, shifting of gears of transmission of said motorcycle,
  means for changing the electrical power applied to said means for producing light, said means for changing responsive to said means for measuring, said electrical power being applied to said means for producing light, and
  one of the group consisting of: means for changing color, a plurality of means for producing light of different colors.

6. A display device for a wheel in combination with a motorcycle, said motorcycle capable of having motion, including:
  at least one means for producing light, said means for producing light includes at least one light source that is visible only from one side of said wheel,
  means for transferring electrical power from a power source not located on said wheel to said means for producing light,
  means for measuring at least one of the group consisting of: angular velocity of said wheel, angular or centripetal acceleration of said wheel, angular or centripetal jerk of said wheel, velocity of said motorcycle, acceleration of said motorcycle, jerk of said motorcycle, speed (RPM) of engine of said motorcycle, shifting of gears of transmission of said motorcycle,
  means for changing the electrical power applied to said means for producing light, said means for changing responsive to said means for measuring, said electrical power being applied to said means for producing light, and
  one of the group consisting of: means for changing color, a plurality of means for producing light of different colors.

7. A display device for a wheel in combination with a motorcycle, said motorcycle capable of having motion, including:
  at least one means for producing light, said means for producing light includes at least one light source located on each side of said wheel,
  means for transferring electrical power from a power source not located on said wheel to said means for producing light,
  means for measuring at least one of the group consisting of: angular velocity of said wheel, angular or centripetal acceleration of said wheel, angular or centripetal jerk of said wheel, velocity of said motorcycle, acceleration of said motorcycle, jerk of said motorcycle, speed (RPM) of engine of said motorcycle, shifting of gears of transmission of said motorcycle,
  means for changing the electrical power applied to said means for producing light, said means for changing responsive to said means for measuring, said electrical power being applied to said means for producing light, and
  means for changing brightness, said means for changing brightness including at least one of the group consisting of: means for altering intensity of said means for producing light, a plurality of means for producing light.

8. A display device for a wheel in combination with a motorcycle, said motorcycle capable of having motion, including:
  at least one means for producing light, said means for producing light includes at least one light source that is visible only from one side of said wheel,
  means for transferring electrical power from a power source not located on said wheel to said means for producing light,
  means for measuring at least one of the group consisting of: angular velocity of said wheel, angular or centripetal acceleration of said wheel, angular or centripetal jerk of said wheel, velocity of said motorcycle, acceleration of said motorcycle, jerk of said motorcycle, speed (RPM) of engine of said motorcycle, shifting of gears of transmission of said motorcycle, means for changing the electrical power applied to said means for producing light, said means for changing responsive to said means for measuring, said electrical power being applied to said means for producing light, and means for changing brightness, said means for changing brightness including at least one of the group consisting of: means for altering intensity of said means for producing light, a plurality of means for producing light.

9. A method of changing an illuminated display for a wheel in combination with a vehicle, said vehicle capable of having motion, including the steps of:

harnessing power from a power source not located on said wheel, said power source able to produce power independent of vehicle motion, measuring at least one of the group consisting of: angular velocity of said wheel, angular or centripetal acceleration of said wheel, angular or centripetal jerk of said wheel, velocity of said vehicle, acceleration of said vehicle, jerk of said vehicle, speed (RPM) of engine of said vehicle, shifting of gears of transmission of said vehicle, controlling at least one means for producing light, said controlling responsive to said measuring, said means for producing light located on said wheel, and selectively activating said means for producing light such that at any moment in time, a light display unique to one side of said vehicle relative to a coincident light display on the opposite side of said vehicle can be produced whereby at least one of the group consisting of: color, brightness, on-off cycling (including the blinking action of a turn signal) of said means of producing light is visibly different when viewed from opposite sides of said vehicle.

10. A method of changing an illuminated display for a wheel in combination with a motorcycle, said motorcycle capable of having motion, including the steps of:

harnessing power from a power source not located on said wheel, said power source able to produce power independent of motorcycle motion, measuring at least one of the group consisting of: angular velocity of said wheel, angular or centripetal acceleration of said wheel, angular or centripetal jerk of said wheel, velocity of said motorcycle, acceleration of said motorcycle, jerk of said motorcycle, speed (RPM) of engine of said motorcycle, shifting of gears of transmission of said motorcycle, controlling at least one means for producing light, said controlling responsive to said measuring, said means for producing light located on said wheel, said means for producing light includes at least one light source located on each side of said wheel, and selectively activating said means for producing light such that at any moment in time, a light display unique to one side of said wheel relative to a coincident light display on the opposite side of said wheel can be produced whereby at least one of the group consisting of: color, brightness, on-off cycling (including the blinking action of a turn signal) of said means of producing light is visibly different when viewed from opposite sides of said wheel.

11. A method of changing an illuminated display for a wheel in combination with a motorcycle, said motorcycle capable of having motion, including the steps of:

harnessing power from a power source not located on said wheel, said power source able to produce power independent of motorcycle motion, measuring at least one of the group consisting of: angular velocity of said wheel, angular or centripetal acceleration of said wheel, angular or centripetal jerk of said wheel, velocity of said motorcycle, acceleration of said motorcycle, jerk of said motorcycle, speed (RPM) of engine of said motorcycle, shifting of gears of transmission of said motorcycle, controlling at least one means for producing light, said controlling responsive to said measuring, said means for producing light located on said wheel, said means for producing light includes at least one light source that is visible only from one side of said wheel, and selectively activating said means for producing light such that at any moment in time, a light display unique to one side of said wheel relative to a coincident light display on the opposite side of said wheel can be produced whereby at least one of the group consisting of: color, brightness, on-off cycling (including the blinking action of a turn signal) of said means of producing light is visibly different when viewed from opposite sides of said wheel.

* * * * *

UNITED STATES PATENT AND TRADEMARK OFFICE
CERTIFICATE OF CORRECTION

PATENT NO.     : 6,789,928 B2
DATED          : September 14, 2004
INVENTOR(S)    : Mohammed John Fitzgerald Khan It is certified that error appears in the above-identified patent and that said Letters Patent is hereby corrected as shown below:

Column 11,
Line 1, claim 3 should read:

A display device for a wheel in combination with a motorcycle, said motorcycle capable of having motion, including:

at least one means for producing light, said means for producing light includes at least one light source located on each side of said wheel, means for transferring electrical power from a power source not located on said wheel to said means for producing light, means for measuring at least one of the group consisting of:

angular velocity of said wheel, angular or centripetal acceleration of said wheel, angular or centripetal jerk of said wheel, velocity of said motorcycle, acceleration of said motorcycle, jerk of said motorcycle, speed (RPM) of engine of said motorcycle, shifting of gears of transmission of said motorcycle, means for changing the electrical power applied to said means for producing light, said means for changing responsive to said means for measuring, said electrical power being applied to said means for producing light, means for selectively activating said means for producing light such that at any moment in time, a light display unique to one side of said wheel relative to a coincident light display on the opposite side of said wheel can be produced whereby at least one of the group consisting of: color, brightness, on-off cycling (including the blinking action of a turn signal) of said means of producing light is visibly different when viewed from opposite sides of said wheel.

Signed and Sealed this

Twenty-first Day of December, 2004

JON W. DUDAS
*Director of the United States Patent and Trademark Office*